(12) United States Patent
Lee et al.

(10) Patent No.: US 11,258,965 B2
(45) Date of Patent: Feb. 22, 2022

(54) APPARATUS FOR COMPOSING OBJECTS USING DEPTH MAP AND METHOD FOR THE SAME

(71) Applicant: Samsung Electronics Co., Ltd., Suwon-si (KR)

(72) Inventors: Shin Jun Lee, Yongin-si (KR); Nayab Vali Shaik, Bangalore (IN); Rakesh Valusa, Bangalore (IN); Dong Hyun Yeom, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/020,258

(22) Filed: Jun. 27, 2018

(65) Prior Publication Data
US 2019/0058836 A1    Feb. 21, 2019

(30) Foreign Application Priority Data
Aug. 18, 2017    (KR) .................. 10-2017-0104775

(51) Int. Cl.
*H04N 5/272* (2006.01)
*G09G 5/02* (2006.01)
(Continued)

(52) U.S. Cl.
CPC ......... *H04N 5/272* (2013.01); *G06F 3/04845* (2013.01); *G06T 3/40* (2013.01);
(Continued)

(58) Field of Classification Search
CPC ....... G06F 3/04845; G06T 2207/10024; G06T 2207/20221; G06T 3/40; G06T 7/536;
(Continued)

(56) References Cited

U.S. PATENT DOCUMENTS

| 5,345,313 A | 9/1994 | Blank |
| 5,687,306 A | 11/1997 | Blank |

(Continued)

FOREIGN PATENT DOCUMENTS

| CN | 101282492 A | 10/2008 |
| CN | 101315758 A | 12/2008 |

(Continued)

OTHER PUBLICATIONS

European Search Report dated Dec. 11, 2018, issued in the European Application No. 18189026.0-1210.
(Continued)

*Primary Examiner* — Amy R Hsu
(74) *Attorney, Agent, or Firm* — Jefferson IP Law, LLP

(57) ABSTRACT

An electronic device is provided that includes a display, a memory, and a processor. The processor is configured to control to display an image by using the display, to control to display an object on a first area of the image, at least based on a first user input, to determine a depth value of the object, at least based on a second user input, to control to display at least a portion of the object on the image, based on the determined depth value of the object and depth information of the first area, and to control to store, in the memory, depth data and color data of the image to which the object is added.

17 Claims, 20 Drawing Sheets

(51) Int. Cl.

| | | |
|---|---|---|
| *G09G 5/373* | (2006.01) | |
| *G09G 5/377* | (2006.01) | |
| *H04N 5/232* | (2006.01) | |
| *G06T 7/60* | (2017.01) | |
| *H04N 5/44* | (2011.01) | |
| *H04N 5/445* | (2011.01) | |
| *G09G 5/14* | (2006.01) | |
| *H04N 21/422* | (2011.01) | |
| *G06T 7/536* | (2017.01) | |
| *G06T 7/70* | (2017.01) | |
| *G06F 3/0484* | (2013.01) | |
| *G06T 3/40* | (2006.01) | |

(52) U.S. Cl.
CPC ............... *G06T 7/536* (2017.01); *G06T 7/60* (2013.01); *G06T 7/70* (2017.01); *G09G 5/026* (2013.01); *G09G 5/14* (2013.01); *G09G 5/373* (2013.01); *G09G 5/377* (2013.01); *H04N 5/232935* (2018.08); *H04N 5/44504* (2013.01); *H04N 21/42204* (2013.01); *G06T 2207/10024* (2013.01); *G06T 2207/20221* (2013.01); *G09G 2340/10* (2013.01); *G09G 2340/12* (2013.01)

(58) Field of Classification Search
CPC ......... G06T 7/60; G06T 7/70; G09G 2340/10; G09G 2340/12; G09G 5/026; G09G 5/14; G09G 5/373; G09G 5/377; H04N 5/232935; H04N 5/272; H04N 5/4403; H04N 5/44504
See application file for complete search history.

(56) References Cited

U.S. PATENT DOCUMENTS

| | | | |
|---|---|---|---|
| 8,773,460 B2 | 7/2014 | Miyamoto | |
| 8,817,070 B2 | 8/2014 | Benyola | |
| 8,970,621 B2* | 3/2015 | Hirota | G06F 3/0481 345/629 |
| 9,113,059 B2 | 8/2015 | Ikeda | |
| 9,313,479 B2 | 4/2016 | Koyama et al. | |
| 9,363,499 B2 | 6/2016 | Wu et al. | |
| 9,420,255 B2 | 8/2016 | Benyola | |
| 9,860,510 B2 | 1/2018 | Kerdok et al. | |
| 10,051,255 B2 | 8/2018 | Koyama et al. | |
| 2007/0291308 A1* | 12/2007 | Miyamoto | G06T 11/60 358/1.18 |
| 2012/0243786 A1 | 9/2012 | Koyama et al. | |
| 2013/0050256 A1* | 2/2013 | Hirota | G06F 9/451 345/629 |
| 2013/0152152 A1* | 6/2013 | Benyola | H04N 13/302 725/153 |
| 2013/0182072 A1 | 7/2013 | Seo et al. | |
| 2013/0268858 A1 | 10/2013 | Kim et al. | |
| 2014/0267603 A1* | 9/2014 | Kerdok | H04N 13/122 348/43 |
| 2014/0337800 A1* | 11/2014 | Gray | G06F 3/002 715/835 |
| 2014/0362183 A1 | 12/2014 | Benyola | |
| 2015/0139533 A1 | 5/2015 | Wu et al. | |
| 2015/0254905 A1* | 9/2015 | Ramsby | G02B 30/34 345/419 |
| 2016/0054890 A1* | 2/2016 | Kim | H04N 13/271 715/852 |
| 2016/0198097 A1* | 7/2016 | Yewdall | H04N 5/272 348/659 |
| 2016/0227186 A1 | 8/2016 | Koyama et al. | |
| 2016/0260261 A1* | 9/2016 | Hsu | B23K 9/173 |
| 2016/0309142 A1 | 10/2016 | Kiyosawa | |
| 2017/0148177 A1* | 5/2017 | Takahashi | G06T 13/80 |
| 2017/0220754 A1* | 8/2017 | Harrah | A61B 34/25 |
| 2017/0337705 A1* | 11/2017 | Bendall | G06T 7/0004 |
| 2018/0109773 A1 | 4/2018 | Kerdok et al. | |
| 2018/0176483 A1* | 6/2018 | Knorr | H04N 5/232125 |
| 2018/0204377 A1* | 7/2018 | Ju | G06T 7/55 |
| 2018/0247423 A1* | 8/2018 | Suzuki | G06T 5/50 |
| 2018/0309973 A1 | 10/2018 | Koyama et al. | |
| 2018/0365849 A1* | 12/2018 | Taguchi | G05D 1/0246 |

FOREIGN PATENT DOCUMENTS

| | | |
|---|---|---|
| CN | 103139476 A | 6/2013 |
| CN | 105635557 A | 6/2016 |
| EP | 2 624 571 A2 | 7/2013 |
| JP | 2004/166221 A | 6/2004 |
| JP | 2013-258455 A | 12/2013 |
| JP | 2016/208075 A | 12/2016 |
| KR | 10-2013-0115016 A | 10/2013 |
| KR | 10-2015-0133577 A | 11/2015 |

OTHER PUBLICATIONS

European Search Report dated Oct. 19, 2018, issued in the European Application No. 18189026.0-1210.
International Search Report dated Oct. 5, 2018, issued in the International Application No. PCT/KR2018/007281.
Chinese Office Action with English translation dated Jun. 22, 2021; Chinese Appln. No. 201810939072.0.
European Summons dated Aug. 12, 2021; European Appln. No. 18 189 026.0-1210.

* cited by examiner

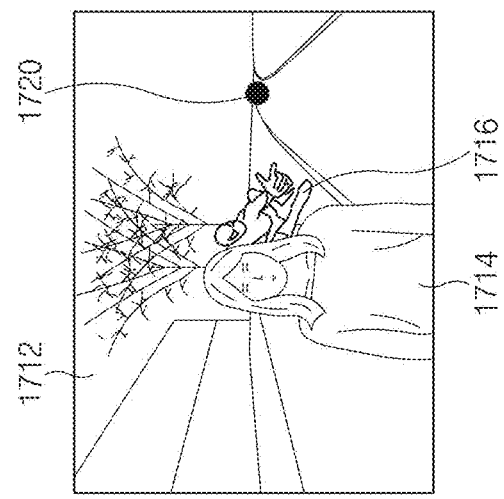
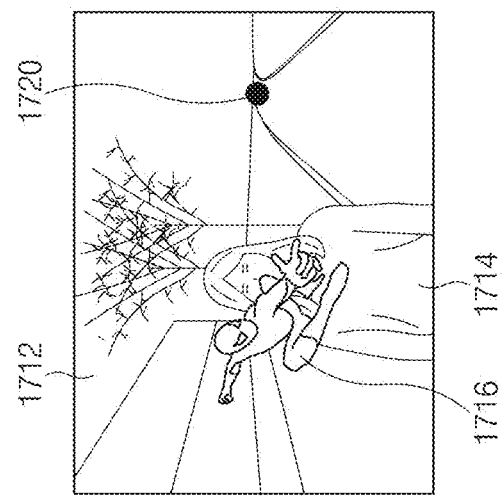
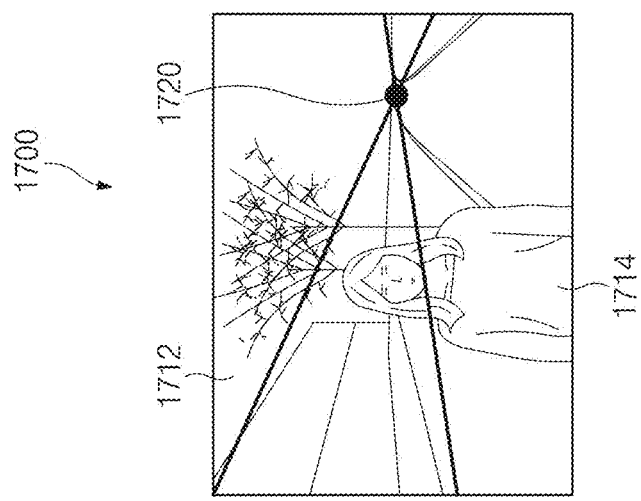
FIG.17

APPARATUS FOR COMPOSING OBJECTS USING DEPTH MAP AND METHOD FOR THE SAME

CROSS-REFERENCE TO RELATED APPLICATION(S)

This application is based on and claims priority under 35 U.S.C. § 119(a) of a Korean patent application number 10-2017-0104775, filed on Aug. 18, 2017, in the Korean Intellectual Property Office, the disclosure of which is incorporated by reference herein its entirety.

BACKGROUND

1. Field

The disclosure relates to an apparatus for composing objects using a depth map and a method for the same.

2. Description of Related Art

An electronic device may acquire a color image and a depth map by using at least one image sensor. The color image may include a red, green, blue (RGB) value of each of pixels included in the image, and the depth map may include a depth value of each pixel. The depth value may be a value representing the distance between a subject and the electronic device (or at least one image sensor). For example, when depth values of some areas including a plurality of pixels are greater than depth values of other areas in the depth map, a subject corresponding to the some areas may be closer to the electronic device than a subject corresponding to the other areas.

The electronic device may provide, for a user, a user interface (UI) for composing objects. The object may include, for example, a sticker, a label, a drawing, a memo, an image, a mosaic, or calligraphy.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for electronic device for composing objects in an image by using a depth value of an object and a method for the same.

Although an electronic device provides, for a user, a user interface (UI) for composing objects, the electronic device may not provide functions of adjusting and storing depth values of the objects.

Additional aspects will be set forth in part in the description which follows and, in part, will be apparent from the description, or may be learned by practice of the presented embodiments.

In accordance with an aspect of the disclosure, an electronic device is provided. The electronic device includes a display, a memory, and a processor. The processor may be configured to control to display an image by using the display, to control to display an object on a first area of the image, at least based on a first user input, to determine a depth value of the object, at least based on a second user input, to control to display at least a portion of the object on the image, based on the determined depth value of the object and depth information of the first area, and to control to store, in the memory, depth data and color data of the image to which the object is added.

In accordance with another aspect of the disclosure, a method of an electronic device is provided. The method includes displaying an image, displaying an object on a first area of the image, at least based on a first user input, determining a depth value of the object, at least based on a second user input, displaying at least a portion of the object on the image, based on the determined depth value of the object and depth information of the first area, and storing depth data and color data of the image to which the object is added.

In accordance with another aspect of the disclosure, an electronic device is provided. The electronic device includes one or more image sensors to acquire at least one of a color image or a depth map, a display, a memory, and a processor. The processor may be configured to create an image by composing the at least one of the color image and the depth map, to control to display an image by using the display, to control to display an object on a first area of the image, at least based on a first user input, to determine a depth value of the object, at least based on a second user input, to control to display at least a portion of the object on the image, based on the determined depth value of the object and depth information of the first area, and to control to store, in the memory, depth data and color data of the image to which the object is added.

As described above, according to embodiments disclosed in the present disclosure, an electronic device may provide a function of adjusting a depth value of an object to meet the demand of a user by editing an object using a depth map in an image.

According to embodiments disclosed in the present disclosure, the electronic device may additionally edit an object composed with an image by generating and storing a depth value of an object.

Besides, a variety of effects directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 illustrates a series of operations of displaying an object changed in depth, size, and position, based on the changed depth value and the vanishing point of the image, according to various embodiments of the disclosure.

Through the drawings, reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
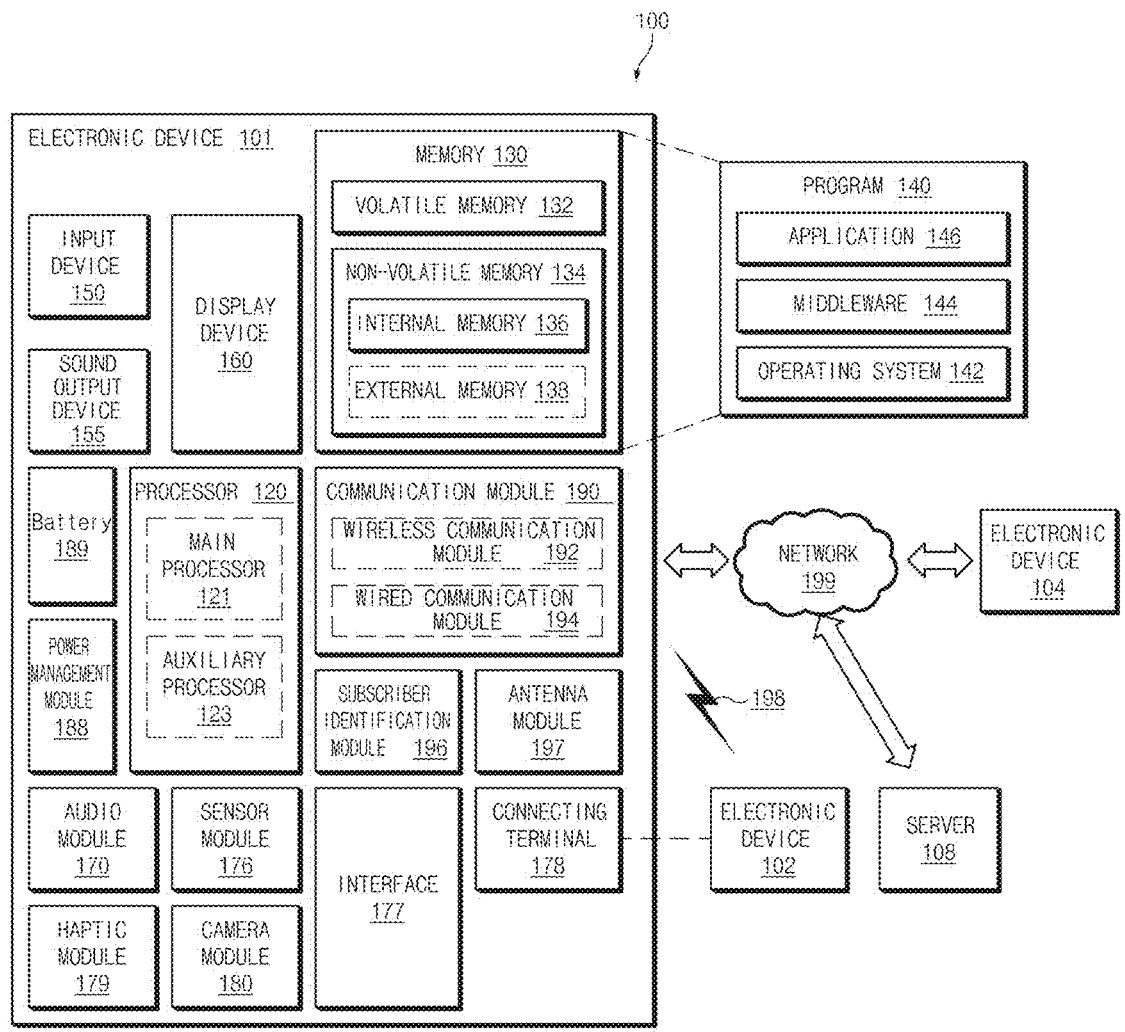
FIG. 1 illustrates a block diagram of an electronic device under a network environment for composing an object by using a depth map, according to various embodiments of the disclosure.

FIG. 1 is a block diagram of an electronic device in a network environment for composing an object by using a depth map, according to various embodiments of the disclosure.

Referring to FIG. 1, the electronic device 101 may communicate with an electronic device 102 through a first network 198 (e.g., a short-range wireless communication) or may communicate with an electronic device 104 or a server 108 through a second network 199 (e.g., a long-distance wireless communication) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display or a display unit).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary 123 may operate separately from the main processor 121 or embedded.

The auxiliary 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary 123 (e.g., the image signal processor or the communication processor) may be implemented as a part of another component (e.g., the camera module 180 or the communication module 190) that is functionally related to the auxiliary 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, a high-definition multimedia interface (HDMI), a universal serial bus (USB) interface, an SD card interface, or an audio interface.

A connection terminal 178 may include a connector that physically connects the electronic device 101 to the external electronic device (e.g., the electronic device 102), for example, an HDMI connector, a USB connector, a secure digital (SD) card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., an local area network (LAN) communication module or a power line communication module) and may communicate with the external electronic device using a corresponding communication module among them through the first network 198 (e.g., the short-range communication network such as a Bluetooth, a Wi-Fi direct, or an infrared data association (IrDA)) or the second network 199 (e.g., the long-distance wireless communication network such as a cellular network, an internet, or a computer network (e.g., LAN or wireless area network (WAN)). The above-mentioned various communication modules 190 may be implemented into one chip or into separate chips, respectively.

According to an embodiment of the disclosure, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

According to an embodiment of the disclosure, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2:
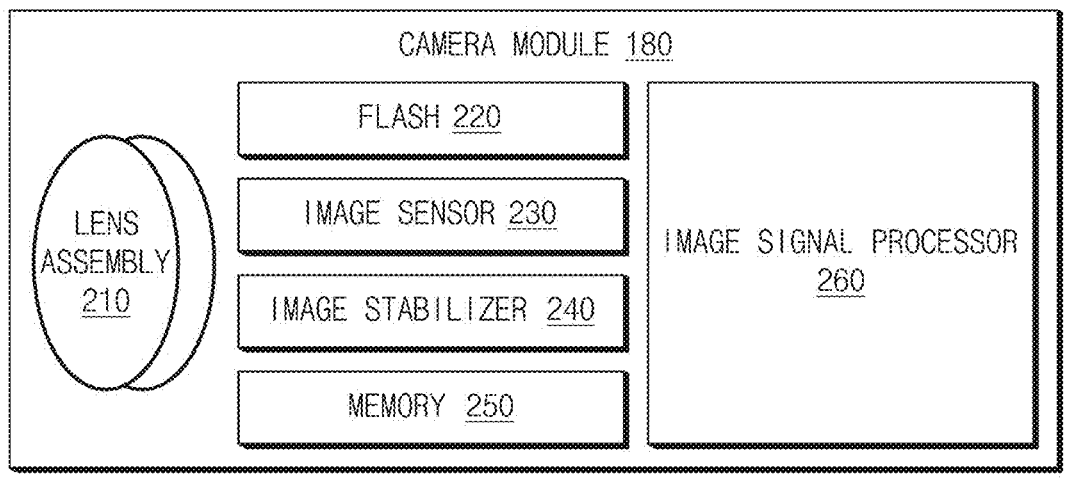
FIG. 2. illustrates a block diagram of a camera module for composing an object using a depth map, according to various embodiments of the disclosure.

FIG. 2 illustrates a block diagram of a camera module for composing an object using a depth map, according to various embodiments of the disclosure.

Referring to FIG. 2, the camera module 180 may include a lens assembly 210, a flash 220, an image sensor 230, an image stabilizer 240, a memory 250 (e.g., buffer memory), or an image signal processor 260. The lens assembly 210 may collect light emitted from a subject which is a target of image capturing. The lens assembly 210 may include one or more lenses. According to an embodiment, the camera module 180 may include a plurality of lens assemblies 210. In this case, the camera module 180 may be, for example, a dual camera, a 360-degree camera, or a spherical camera. A plurality of lens assemblies 210 may have the same lens attributes (e.g., a field of view, a focal length, an autofocus, an f number, or an optical zoom). Alternatively, at least one lens assembly may be different from another lens assembly in at least one lens attribute. The lens assembly 210 may include, for example, a wide angle lens or a telephoto lens. The flash 220 may emit light in order to strengthen light emitted from the subject. The flash 220 may include one or more light-emitting diode (LEDs) (e.g., a red-green-blue (RGB) LED, white LED, infrared LED, or ultraviolet LED) or a xenon lamp.

The image sensor 230 may acquire an image corresponding to the subject by converting light, which is received from the subject through the lens assembly 210, to an electrical signal. According to an embodiment, the image sensor 230 may include, for example, one selected from among image sensors, such as an RGB sensor, a black and white (BW) sensor, an infrared (IR) sensor, or an ultra violet (UV) sensor, having different attributes, a plurality of image sensors having the same attribute, or a plurality of image sensors having different attributes. Each image sensor included in the image sensor 230 may be implemented with, for example, a charged coupled device (CCD), or a complementary metal oxide semiconductor (CMOS) sensor. According to an embodiment, when the camera module 180 includes a plurality of lens assemblies 210, the image sensor 230 may include a plurality of image sensors to acquire an image from each of the lens assemblies 210. For example, one of the plurality image sensors may acquire a color image and another image sensor may acquire a depth map (or may be referred to as a depth map image). For another example, the image sensors may operate together to acquire a color image and a color map.

The image stabilizer 240 may move or control at least one lens included in the lens assembly 210 or the image sensor 230 in a specific direction (e.g., may adjust read-out timing), so as to at least partially compensate for a negative influence (e.g., image shaking) exerted on the captured image in response to the movement of the camera module 180 or the movement of the electronic device 101 including the cameral module 180. According to an embodiment of the disclosure, the image stabilizer 240 may be, for example, implemented with an optical image stabilizer, and may detect the movement by using a gyro sensor (not illustrated) or an acceleration sensor (not illustrated) disposed inside or outside the camera module 180.

The memory 250 may at least temporarily store at least a portion of an image, which is acquired through the image sensor 230, for next image processing. For example, when image acquisition is delayed or a plurality of images are acquired at a higher rate, depending on shutter speeds, the acquired original image (e.g., an image having a higher resolution) is stored in the memory 250 and a duplicate (e.g., an image having a lower resolution) of the original image may be previewed through the display device 160. Thereafter, when a specified condition is satisfied (e.g., a user input is received or a system command is generated), at least a portion of the original image, which has been stored in the memory 250, may be acquired and processed by the image signal processor 260. According to an embodiment of the disclosure, the memory 250 may be implemented with at least a portion of the memory 130 or with an additional memory operating independently from the memory 250.

The image signal processor 260 may perform image processing (e.g., depth map creation, 3-D modeling, panorama creation, feature extraction, image composition, or image compensation (e.g., noise reduction, resolution adjustment, brightness adjustment, blurring, sharpening, or softening) with respect to an image acquired from the image sensor 230 or the image stored in the memory 250. Additionally, or alternatively, the image signal processor 260 may perform a control operation (e.g., a control operation (e.g., a control operation of exposure time or read-out timing) of the image sensor 230) with respect to at least one of components included in the camera module 180. The image processed by the image signal processor 260 may be re-stored in the memory 250 for additional image processing or may be transmitted to an external component (e.g., the memory 130, the display device 160, the electronic device 102, the electronic device 104, or the server 108) of the camera module 180. According to an embodiment, the image signal processor 260 may be implemented with at least a portion of the processor 120 or with an additional processor operating independently from the processor 120. When the image signal processor 260 is implemented with the additional processor, images processed by the image signal processor 260 may be displayed on the display device 160 without the change thereof or may be displayed on the display device 160 after being subject to additional image processing.

According to an embodiment of the disclosure, the electronic device 101 may include two or more camera modules 180 having mutually different attributes or functions. In this case, for example, at least one camera module 180 may be a wide-angle camera or front camera, and at least one another camera module may be a telephoto camera or rear camera.

In the following description, operations may be implemented by an electronic device (e.g., the electronic device 101) or may be implemented by a processor (e.g., the processor 120 or the image signal processor 260) included in the electronic device. When the operations are implemented by the processor, the processor may execute instructions stored in a memory (e.g., the memory 130 or the memory 250) of the electronic device, thereby implementing the operations.

Figure 3:
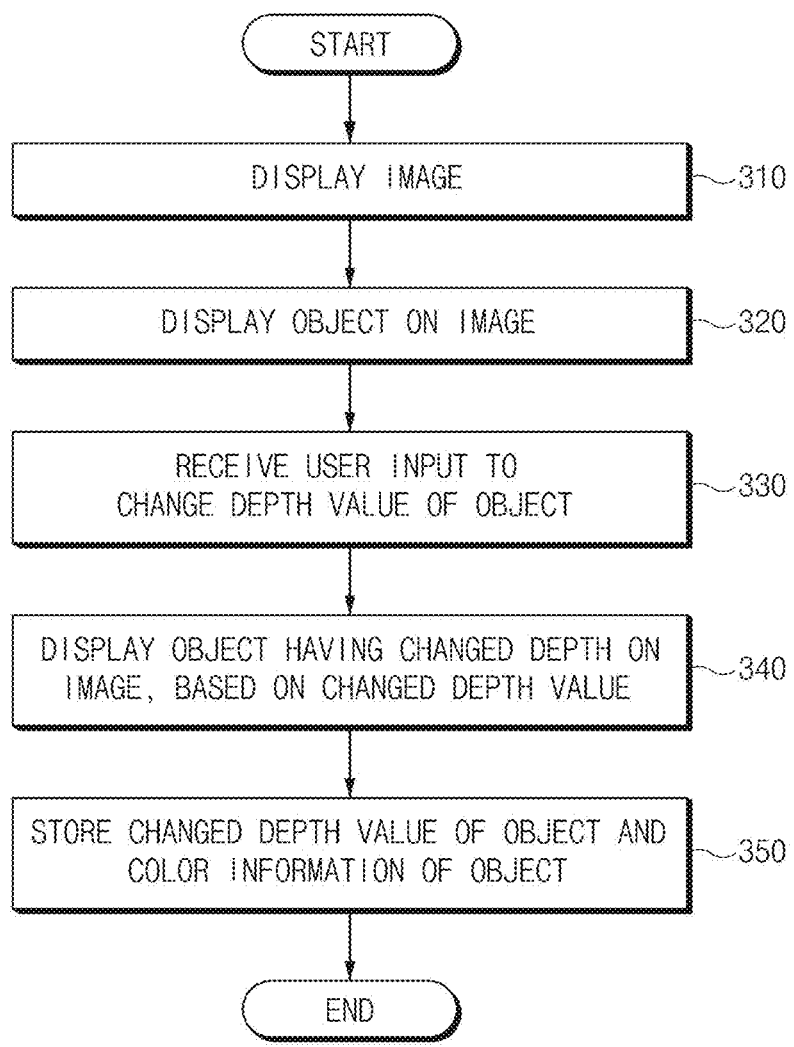
FIG. 3 illustrates a flowchart of operations of an electronic device for composing an object using a depth map and storing a composition result, according to various embodiments of the disclosure.

FIGS. 3 to 5 illustrate a series of operations of composing objects by using a depth map and of storing the composition result, according to various embodiments of the disclosure.

Referring to FIG. 3, in operation 310, an electronic device (e.g., the electronic device 101, the processor 120, or the image signal processor 260) may display an image on a display (e.g., the display device 160). According to various embodiments disclosed in the disclosure, the image may be referred to as an image created by composing a color image and a depth map. For example, the image may refer to an image, which is captured through an image sensor, or a preview image. The operation of creating the image by composing the color image and the depth map will be described with reference to FIG. 4A.

Figure 4A:
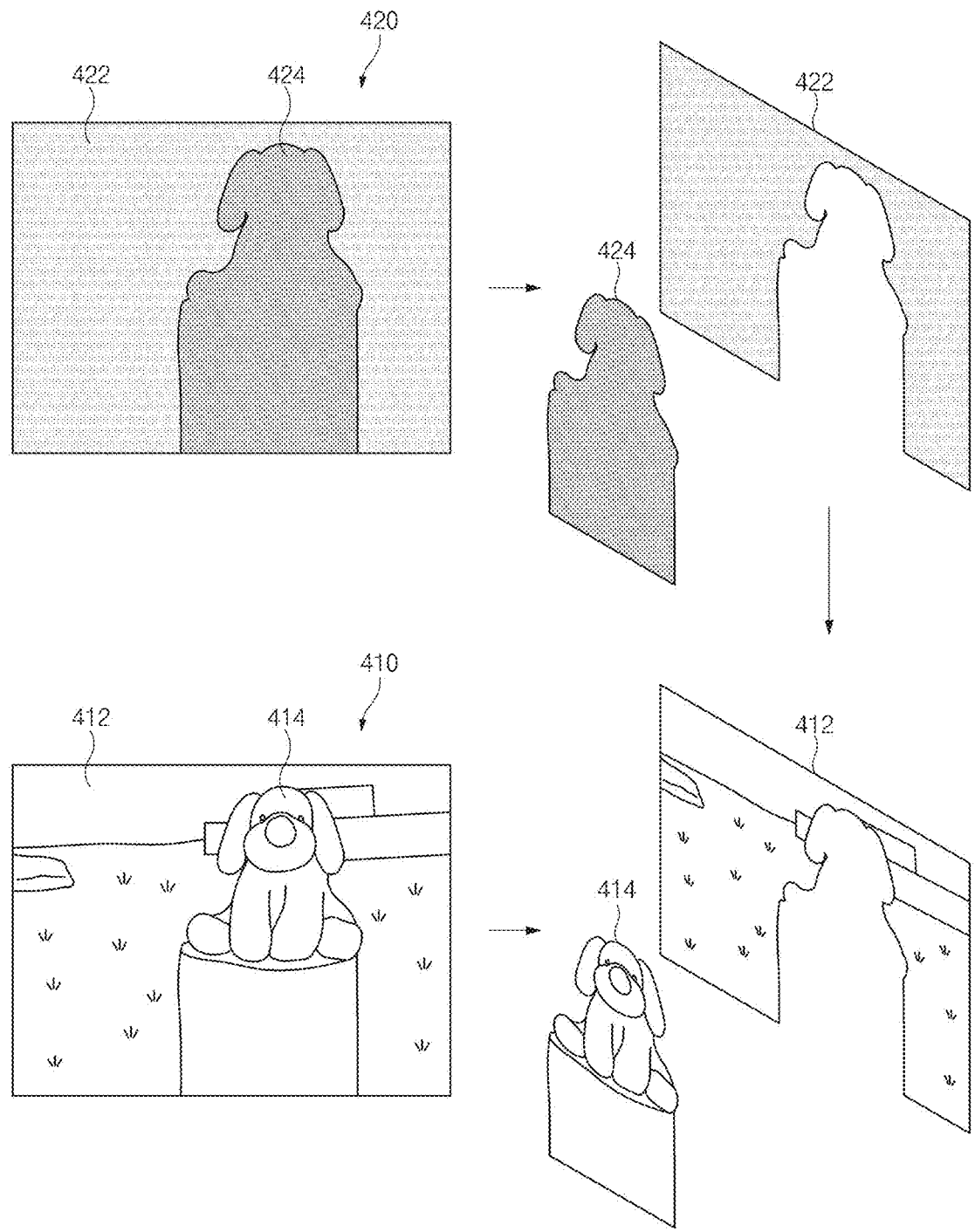
FIG. 4A illustrates a series of operations of creating an image by using a depth map, according to various embodiments of the disclosure.

Referring to FIG. 4A, the electronic device may acquire a color image 410 and a depth map 420 through at least one image sensor. The color image 410 may show the distribution (color information) of RGB values of pixels constituting two dimension (2D) coordinates (e.g., an X axis or a Y axis). Although various embodiments of the disclosure have been described regarding the color image 410 based on RGB by way of example, various pieces of information (e.g., YCrCb, or YUV) may be used to represent the color distribution of the image instead of the RGB. The electronic device may display a background subject 412 or a foreground subject 414 by using color information of the color image 410. The depth map 420 may represent the distribution (depth information) of depth values of the pixels constituting the 2D coordinates. For example, when 8-bit data is allocated to one pixel of an image, the depth value may be expressed as a value in the range of 0 to $2^8$, that is, 255. When n bits are allocated to each pixel, the depth value may have an appropriate value in the range from 0 to $2^n$. The depth value may be set to be in inverse proportion to the distance between the electronic device and a subject (that is, the depth value is increased as the subject approaches the electronic device). In contrast, the depth value may be set to be in proportion to the distance between the electronic device and the subject. Hereinafter, various embodiments in the disclosure will be described regarding an example that the depth value is increased as the distance between the electronic device and the subject becomes shorter.

According to an embodiment of the disclosure, the electronic device may select an image area, which has the distribution of depth values in a specific range, from the depth map 420 and may separate the image area. The image area may be referred to as an area including a plurality of pixels in an image. For example, in the depth map 420, pixels included in an image area 422 (an area, which corresponds to the background subject 412, in the color image 410) may have depth values in a specific range based on a first value, and pixels included in an image area 424 (an area, which corresponds to the foreground subject 414, in the color image 410) may have depth values in a specific range based on a second value. In this case, the electronic device may separate the image area 422 from the image area 424 by using the pixels having the depth values within mutually different ranges. The electronic device may place the image area 422 and the image area 424 in mutually different three dimensional (3D) spaces (e.g., Z axis) depending on the distributions of the depth values of the image area 422 and the image area 424. According to an embodiment, the electronic device may place at least two image areas, which are separated from each other, on virtual planes, respectively. For example, the electronic device may place the image area 424 having the greater depth value range on the plane in the front of the image area 422. The electronic device may display the foreground subject 414 and the background subject 412 representing mutually different depth values by composing the image area 422 and the image area 424, which are placed on the mutually different planes, with the color image 410.

Figure 4B:
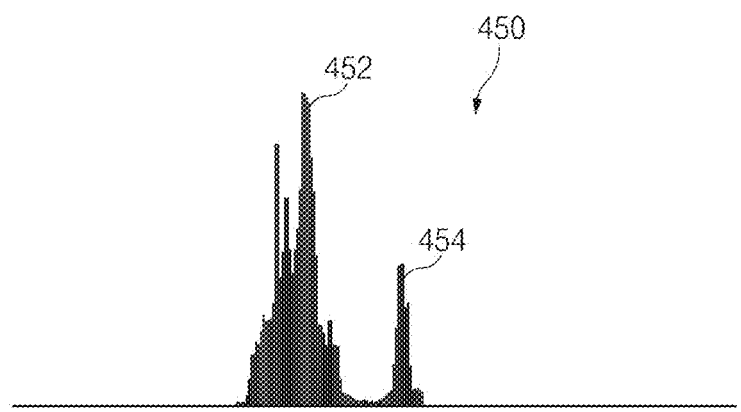
FIG. 4B illustrates a histogram made by using a depth map, according to various embodiments of the disclosure.

Referring to FIG. 4B, a histogram 450 may be made to represent the distribution of the depth values of the depth map 420. The horizontal axis of the histogram 450 represents the depth values. The horizontal axis may have, for example, values of 0 to 255, or may have converted values in the range of 0 to 100. In addition to the above embodiment, the scale of the horizontal axis may be variously defined by those skilled in the art. The vertical axis of the histogram 450 may represent the frequency (e.g., the number of pixels) of the depth values. A depth value distribution 452 may represent a depth value distribution of the image area 422 and a depth value distribution 454 may represent a depth value distribution of the image area 424.

In operation 320, the electronic device may display an object on an image, in response to a user input of adding the object. The object may include, for example, a sticker, a label, a drawing, a memo, an image, a mosaic, or calligraphy. According to an embodiment, the electronic device may display an object on a first area in response to a user input of placing (moving) the object in a specific area (a first area) of the image. According to another embodiment, when a specific condition is satisfied without the user input of placing the object in the specific area (e.g., when a user input of selecting the object is received, when a user input of selecting an image editing menu is received, when image capturing is completed, or when the electronic device enters an image capturing mode), the electronic device may automatically display the object on the first area.

According to an embodiment of the disclosure, the electronic device may display an object having a preset depth value. For example, to prevent a user experience that an added object is hidden and not viewed by another image or partially viewed, the preset depth value may be greater than the maximum depth value (the maximum depth value in the depth value distribution 454) of the image. For another example, to induce a user to change the depth of the added object, the preset depth value may have an appropriate value between the minimum depth value and the maximum depth value of the image such that a portion of the object is displayed while a remaining portion of the object is hidden by the image.

In operation 330, the electronic device may receive a user input of changing (or determining) the depth value of the object. According to an embodiment, the electronic device may receive a user input of moving an indicator representing the depth value of the object. The indicator representing the depth value of the object may be displayed on the image or may be displayed on a screen outside a screen in which the image is displayed.

In operation 340, the electronic device may display at least a portion of the object on an image, based on the changed depth value of the object and the depth information of the first area.

Figure 5A:
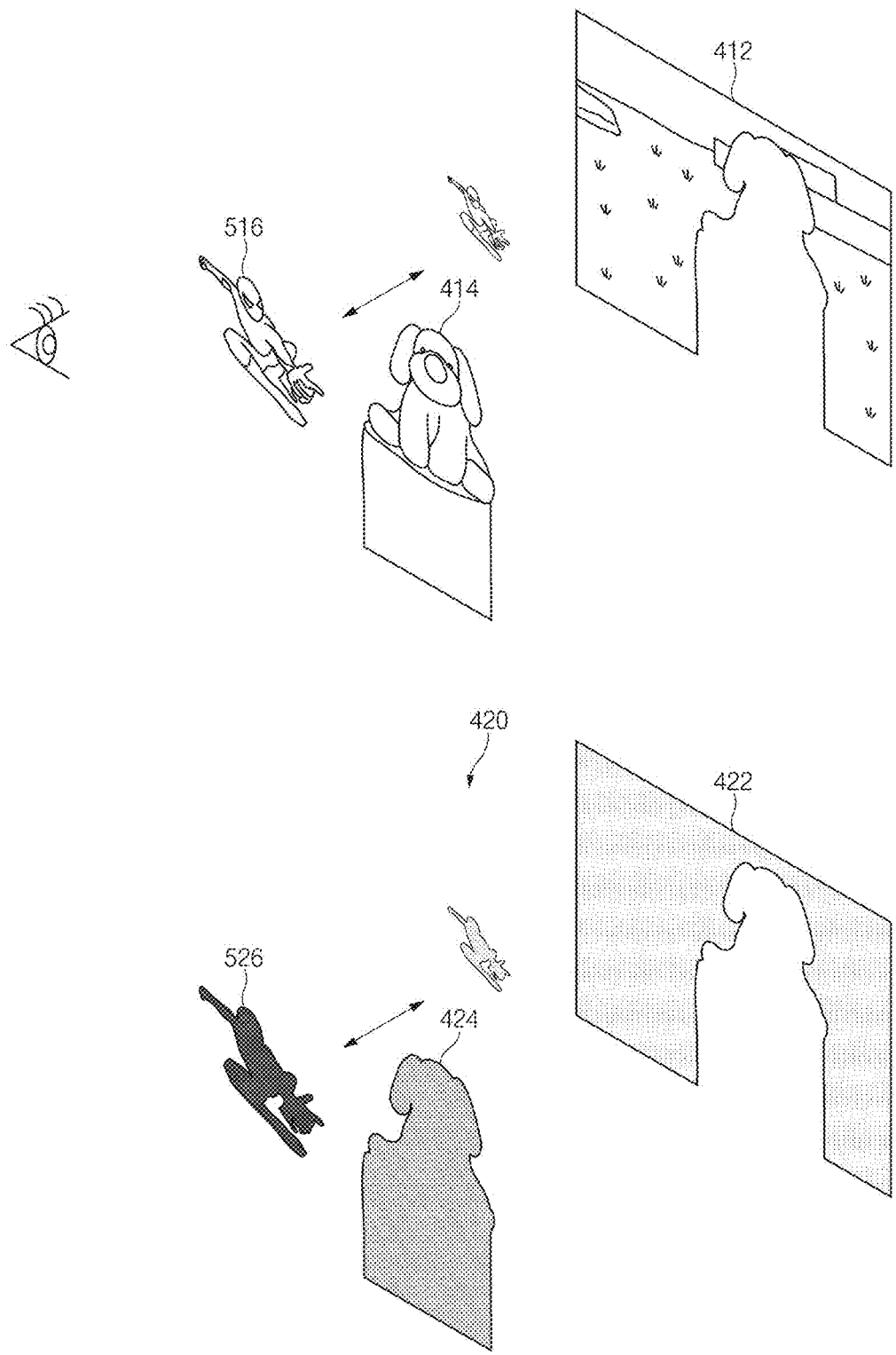
FIG. 5A illustrates a series of operations of creating objects by using a depth map, according to various embodiments of the disclosure.
Figure 5B:
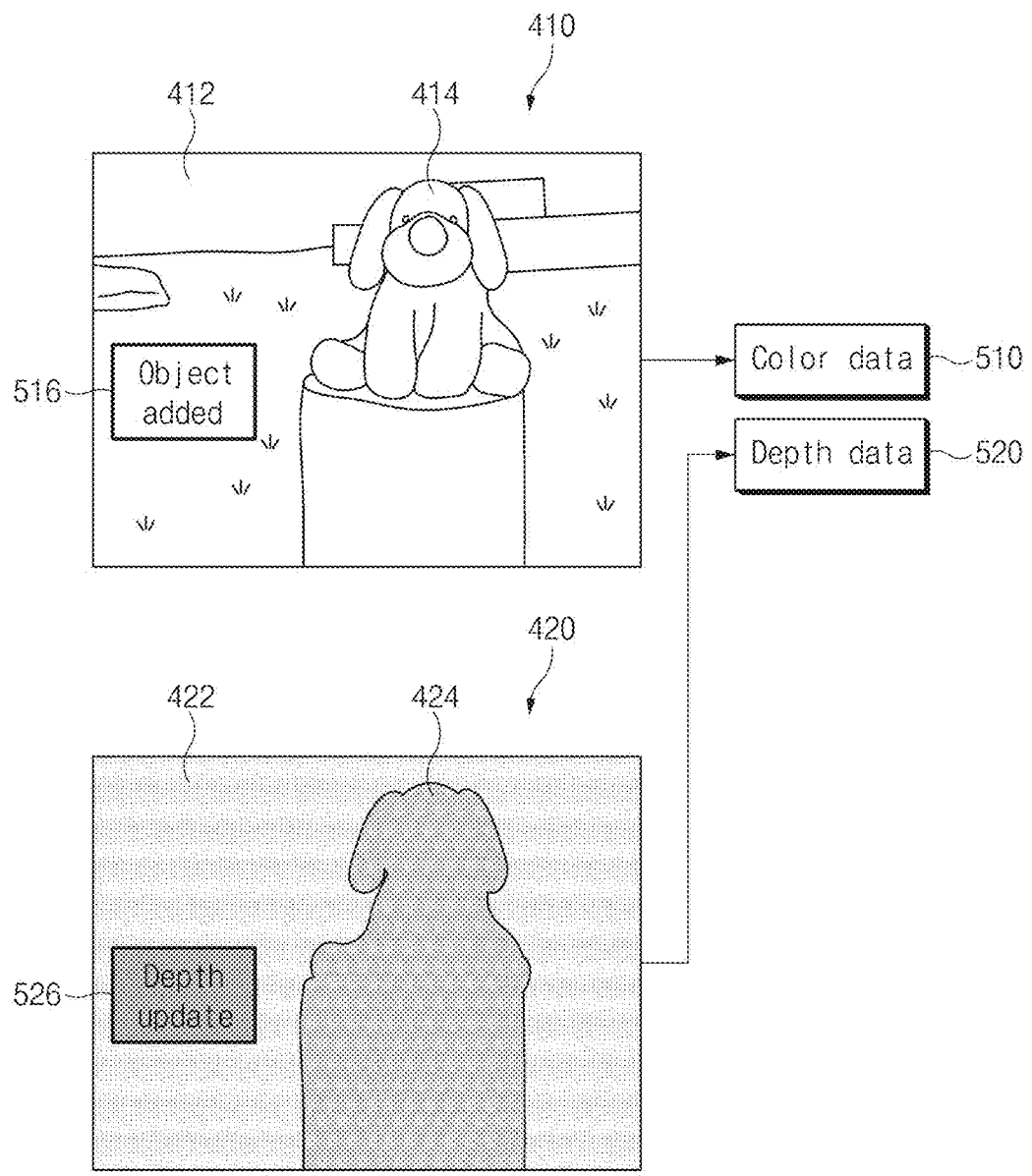
FIG. 5B illustrates a series of operations of storing depth data and color data of an image to which an object is added, according to various embodiments of the disclosure.

Referring to FIG. 5A, in response to a user input of changing a depth value of an object 516, the electronic device may change a depth value of an image area 526 representing the depth value of the object 516. When the changed depth value is greater than the maximum depth value of the depth value distribution 454 illustrated in FIG. 4B, the electronic device may display the image area 526 on a front plane of a plane on which the image area 424 is displayed. In this case, the object 516 may be viewed to the user as if the object 516 is placed at a distance closer to the electronic device than the foreground subject 414. When the changed depth value is less than the minimum depth value of the depth value distribution 454 and greater than the maximum depth value of the depth value distribution 452, the electronic device may display the image area 526 on the plane interposed between a plane on which the image area 424 is displayed and a plane on which the image area 422 is displayed. In this case, the object 516 may be viewed to the user as if the object 516 is farther apart from the electronic device than the foreground subject 414 and closer to the electronic device than the background subject 412. According to an embodiment, the electronic device may display at least a portion of an object on the image.

In operation 350, the electronic device may store, in a memory (e.g., the memory 130), data on the depth value of the object and the color information of the object. For example, referring to FIG. 5B, the electronic device may store color data 510 of the color image 410 to which the object 516 is added and depth data 520 of the depth map 420 including the depth value of the image area 526 corresponding to the added object 516. According to an embodiment, the electronic device may store the depth data 520 as metadata for the color data 510. According to another embodiment, the electronic device may store the color data 510 and the depth data 520 as the dedicated data. According to an embodiment, the electronic device may store, in the memory, the image data, to which the object 516 is added, as data identical to image data (e.g., image data to which the object 516 is not added) previously stored or as dedicated data.

The electronic device may provide a user interface, which is used to change the depth of the object, for a user to meet a user demand by editing an object in the image using the depth value. In addition, the electronic device may provide a function of additionally re-editing the object by storing the changed depth value of the object together with the color information of the object.

Figure 6:
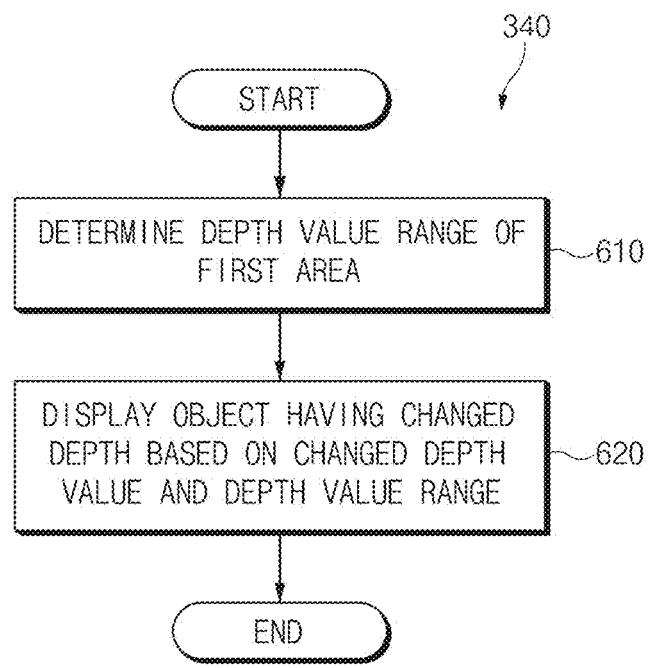
FIG. 6 illustrates a flowchart of the operations of the electronic device of composing objects by using a depth value range, according to various embodiments of the disclosure.
Figure 7:
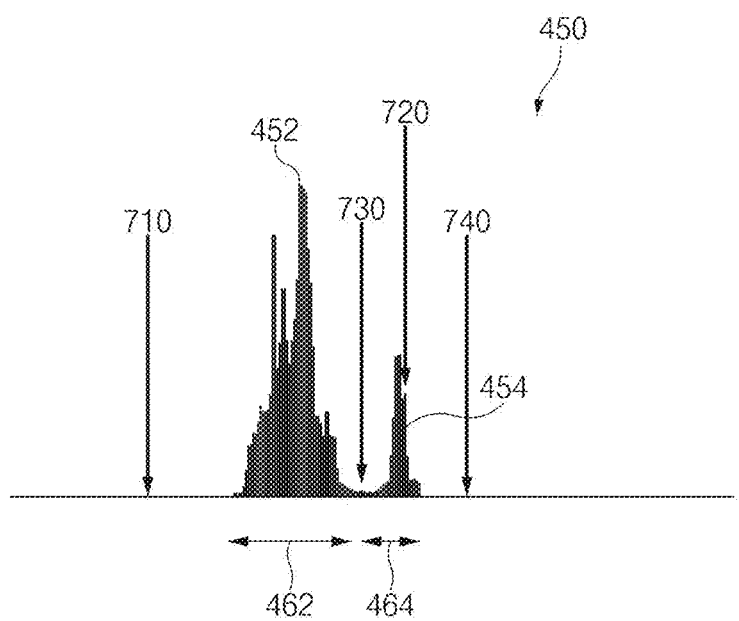
FIG. 7 illustrates a histogram representing a depth value range, according to various embodiments of the disclosure.
Figure 8:
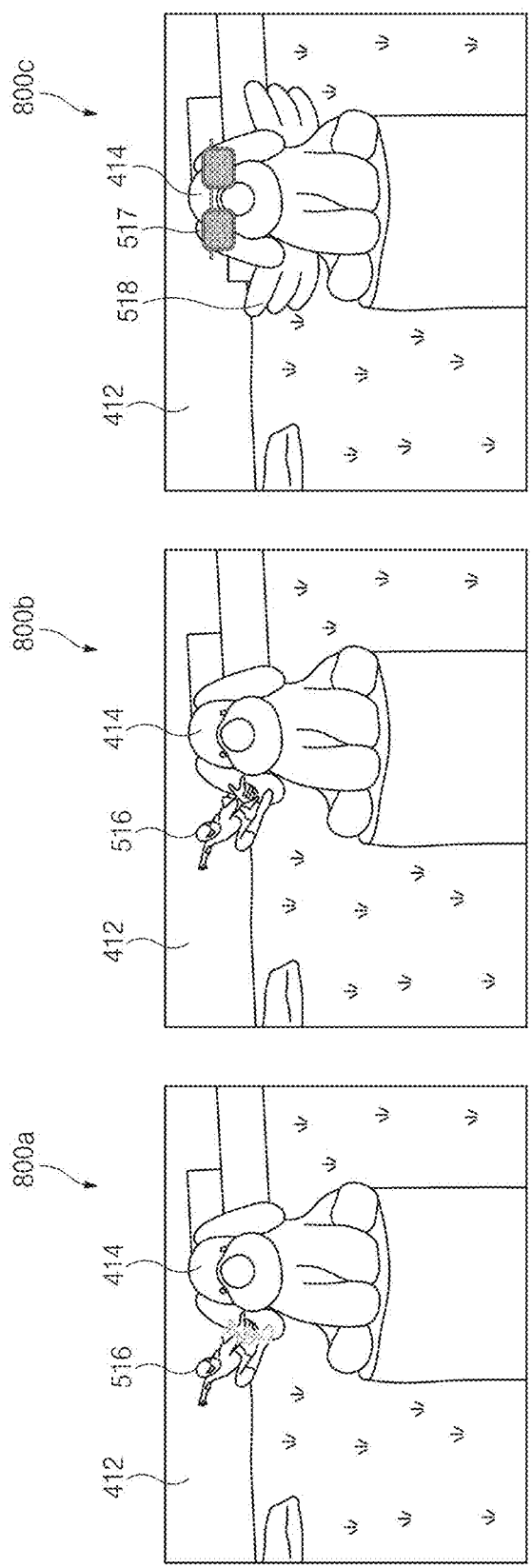
FIG. 8 illustrates a series of operations of composing objects by using a depth map range, according to various embodiments of the disclosure.

FIGS. 6 to 8 illustrate a series of operations of composing objects by using a depth value range, according to various embodiments. Operations illustrated in FIG. 6 may be operations obtained by implementing operation 340 of FIG. 3 in more detail.

Referring to FIG. 6, in operation 610, an electronic device (e.g., the electronic device 101, the processor 120, the image signal processor 260) may determine the range (e.g., the range from 0 to 255 or the range from 0 to a value obtained by converting 255 based on 100) of depth values of pixels included in the first area (that is, an area having an object). For example, referring to FIG. 5, when the first area, in which the object 516 is positioned, is overlapped with the foreground subject 414, the electronic device may determine the depth value range of the image area 424. When at least a portion of the first area is overlapped with the foreground subject 414, and when a remaining portion of the first area is overlapped with the background subject 412, the electronic device may determine the depth value range of each of the image area 422 and the image area 424. According to an embodiment, the electronic device may determine the depth value range by using the histogram.

Referring to FIG. 7, the depth value range of the depth value distribution 452 (that is, the image area 422) may be a range 462 and the depth value range of the depth value distribution 454 (that is the image area 424) may be a range 464.

In operation 620, the electronic device may display at least a portion of an object having the changed depth, based on the changed depth value of the object and the depth value range of the first area. For example, referring to reference number 800a of FIG. 8, the depth value of the object 516 may be changed to a depth value 720 of FIG. 7 in response to a user input. Since the depth value 720 is included in the range 464, the depth value of the object 516 may be equal to the depth values of at least some pixels of the foreground subject 414. In this case, the object 516 may be displayed while being overlapped with the foreground subject 414.

FIG. 8 illustrates a series of operations of composing objects by using a depth map range, according to various embodiments of the disclosure.

According to an embodiment of the disclosure, the electronic device may determine the depth value of the first area such that the changed depth value of the object is not in the depth value range of the first area. For example, when the depth value of the object 516 is changed to a depth value 720 in response to the user input, the electronic device may change the depth value of the object 516 to a depth value 710, a depth value 730, or a depth value 740 which is not in the range 462 and the range 464. For example, when the depth value of the object 516 is the depth value 740, the object 516 may be displayed on a plane in the front of the plane on which the foreground subject 414 is displayed as illustrated in reference number 800b of FIG. 8. When the depth value of the object 516 is set not to be in the depth value range of the first area, the electronic device may simultaneously compose at least two objects. For example, referring to reference number 800c, the electronic device may recognize the foreground subject 414 from a preview image or a captured image. The electronic device may compose the foreground subject 414 and objects 517 and 518. The electronic device may set depth values of the object 517 and the object 518 to the depth value 740 and the depth value 730, respectively, such that the depth value range (that is, the range 464) of the foreground subject 414 is not overlapped with each of the depth values of the object 517 and the object 518. A user may recognize that the object 517 is displayed in the front of the foreground subject 414 and the object 518 is displayed in the rear of the foreground subject 414.

The electronic device may change the depth value of the object by using the depth value range, thereby preventing the object from being overlapped with another subject in an image and simultaneously composing at least two objects with the subject.

Figure 9:
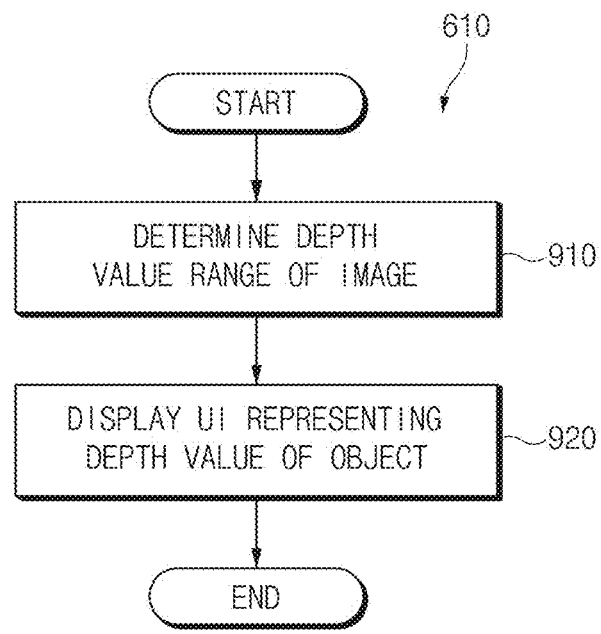
FIG. 9 illustrates the flowchart of the operations of the electronic device for expressing a depth value of an object by using a depth value range of the image, according to various embodiments of the disclosure.
Figure 10A:
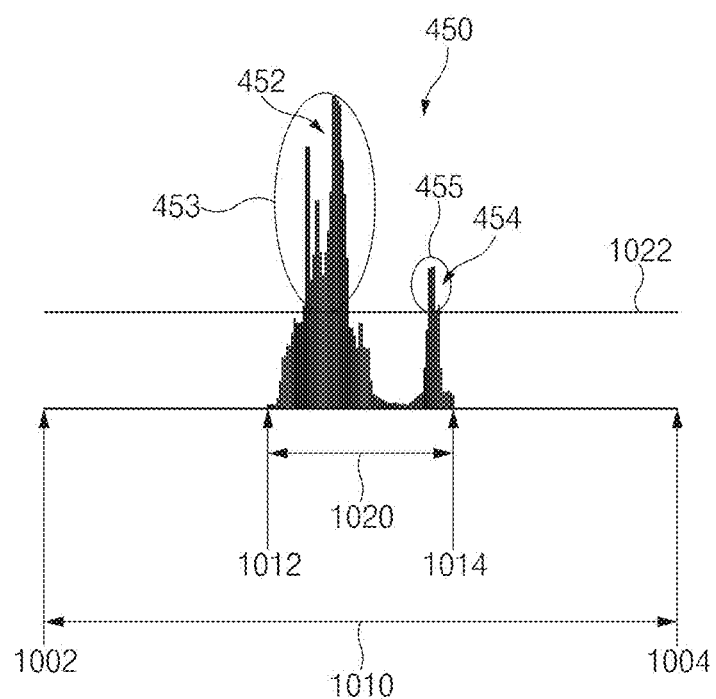
FIG. 10A illustrates a histogram representing the minimum depth value and the maximum depth value of a depth value range of the image, according to various embodiments of the disclosure.
Figure 10B:
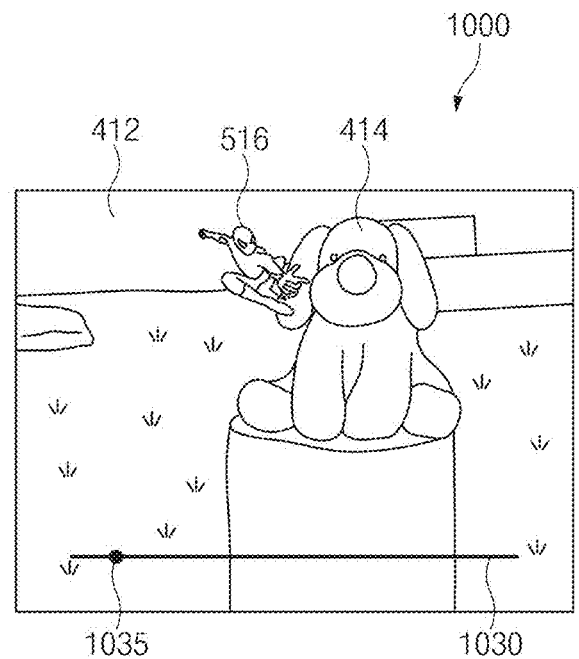
FIG. 10B illustrates a user interface (UI) representing the depth value of an object, according to various embodiments of the disclosure.

FIGS. 9, 10A and 10B illustrate a series of operations of expressing a depth value of an object by using a depth value range of an image, according to various embodiments. Operations illustrated in FIG. 9 may be operations obtained by implementing operation 610 of FIG. 6 in more detail.

Referring to FIG. 9, in operation 910, an electronic device (e.g., the electronic device 101, the processor 120, or the image signal processor 260) may determine a depth value range of an image. For example, when a histogram 450 illustrated in FIG. 10A represents the depth value range of an image 1000 illustrated in FIG. 10B, the depth value range of the image 1000 may be a range 1020. The minimum depth value of the depth value range of the image 1000 may be a depth value 1012 and the maximum depth value of the depth value range of the image 1000 may be a depth value 1014.

According to an embodiment of the disclosure, the electronic device may adjust the range (or the number) of images areas included in the depth map 420 by using an offset for the frequency (or pixel count) of a depth value of the histogram 450. For example, referring to FIG. 10A, when an offset 1022 of the histogram 450 is set, the electronic device may recognize, as subjects, only image areas corresponding to a depth value distribution 453 and a depth value distribution 455 having the frequency greater than the offset 1022. For another example, when the offset of the histogram 450 is a smaller value, the electronic device may recognize, as one subject, image areas corresponding to the depth value distribution 452 and the depth value distribution 454.

In operation 920, the electronic device may display a UI for representing a depth value of an object by using a depth value range of an image. For example, referring to FIG. 10B, the electronic device may display a UI 1030. Although FIG. 10B illustrates an example that the UI 1030 is displayed in the image 1000, the UI 1030 may be displayed on a lower screen or an upper screen of the image 1000.

According to an embodiment of the disclosure, the length of the UI 1030 may correspond to a range 1010 in the histogram 450 of FIG. 10A. The minimum depth value of the range 1010 may be a depth value 1002 and the maximum depth value of the range 1010 may be a depth value 1004. The depth value 1002 may be, for example, 0. The depth value 1004 may be, for example, 255. When the electronic device is configured such that the range of values on the horizontal axis is converted to the range of 0 to 100, the depth value 1004 may be 100. According to another embodiment, the length of the UI 1030 may correspond to the range 1020 in the histogram 450. The minimum depth value of the range 1020 may be the depth value 1012 and the maximum depth value of the range 1020 may be the depth value 1014. According to another embodiment, the electronic device may re-scale the length of the depth value range (empty depth value range), such as the range from the depth value 1002 to the depth value 1012 or the range from the depth value 1014 to the depth value 1004, representing the frequency of 0 or a significantly small depth value range or the length of the range 1020. For example, the electronic device may finely scale the length of the empty depth value range such that a user of the electronic device does not take into consideration a depth value range out of the range 1020 (that is, the user of the electronic device may undergo the depth change between the object 516 and another subject, even if the depth value of the object 516 is not changed to a value in the empty depth value range). For another example, the electronic device may maintain the length of the empty depth value range and largely scale the length of the range 1020.

According to an embodiment of the disclosure, the UI 1030 may include an indicator 1035 indicating a depth value of the object 516. The electronic device may change the depth value of the object 516 in response to a user input of moving the indicator 1035. Although the electronic device may provide a visual effect that the indicator 1035 continuously moves on the UI 1030, the electronic device may provide a visual effect that the indicator 1035 is jumped to a specific position when the length of the empty depth value range of the histogram 450 or the length of the range 1020 is re-scaled.

Figure 11:
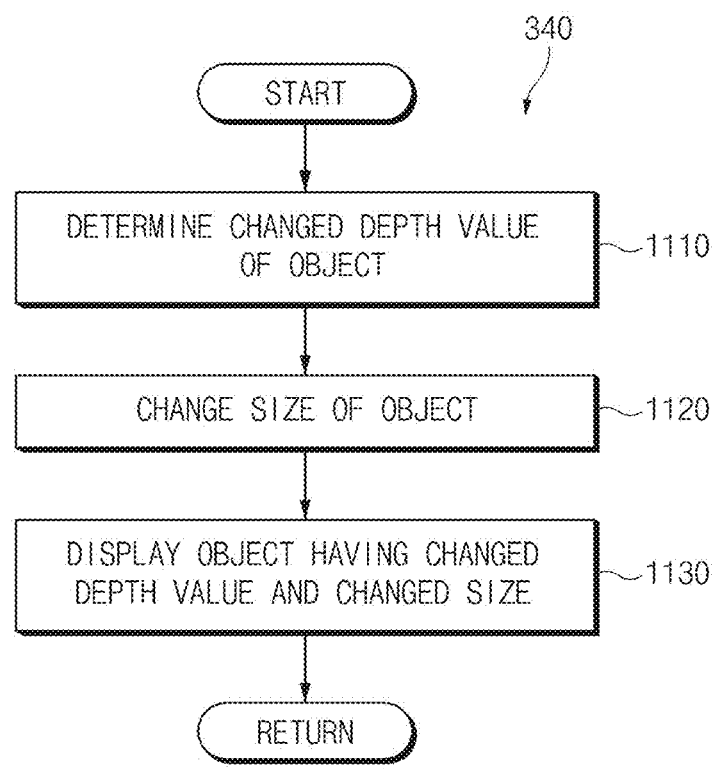
FIG. 11 illustrates a flowchart of operations of an electronic device for presenting an object having the changed depth value and the changed size based on the changed depth value, according to various embodiments of the disclosure.
Figure 12:
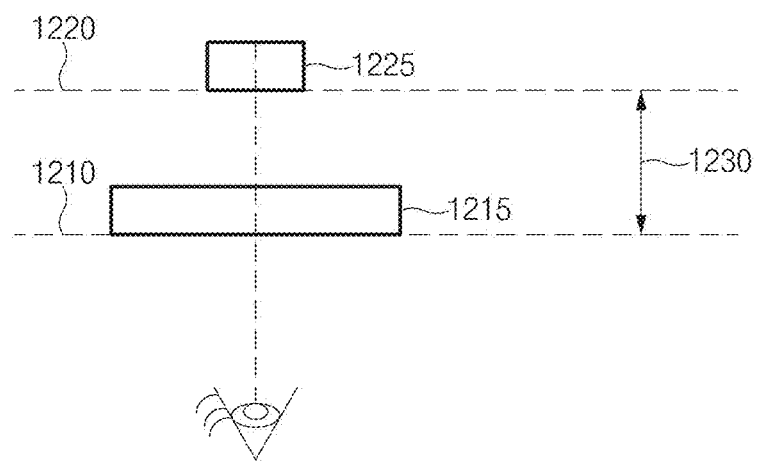
FIG. 12 illustrates a view illustrating an operation of determining the size of an object based on the changed depth value, according to various embodiments.
Figure 13:
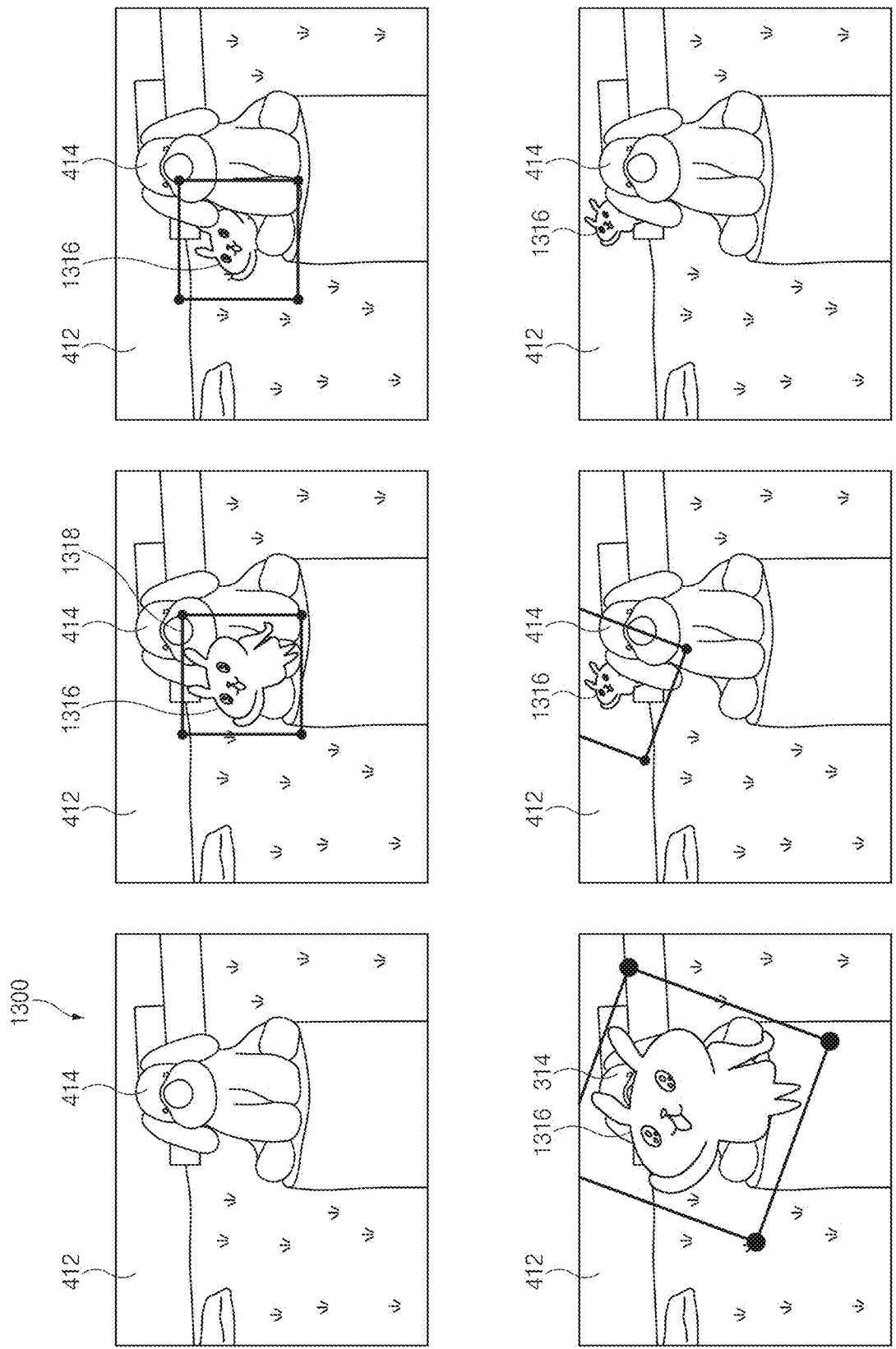
FIG. 13 illustrates a series of operations of displaying an object having the changed depth value and the changed size, based on the changed depth value, according to various embodiments of the disclosure.

FIGS. 11 to 13 illustrate a series of operations of displaying an object having the changed depth value and the changed size based on the changed depth value, according to various embodiments. Operations illustrated in FIG. 11 may be obtained by implementing operation 340 of FIG. 3 in more detail.

Referring to FIG. 11, in operation 1110, the electronic device may determine a changed depth value of an object, in response to a user input of changing the depth value of the object. In operation 1120, the electronic device may change the size of the object, based on the changed depth value of the object. The operation of determining the size of the object will be described with reference to FIG. 12.

Referring to FIG. 12, a plane 1210 and a plane 1220 may be placed in a virtual 3D space (e.g., a Z axis) to correspond to depth values thereof. The distance between the plane 1210 and a user may be shorter than the distance between the plane 1220 and the user. The electronic device may receive a user input of changing the depth value of an object 1215 having the depth value of the plane 1210 to the depth value of the plane 1220. The depth value of the object 1215 may be reduced by a value indicated by reference numeral 1230. The electronic device may change the size (or the area) of the object 1215 to the size of an object 1225 in proportion to the depth value reduced by the value indicated by the reference numeral 1230.

In operation 1130, the electronic device may display at least a portion of the object on an image, based on the changed depth value of the object and the changed size of the object. The electronic device may display the object on one of a plurality of planes by comparing the changed depth value of the object and depth information of the first area in which the object is positioned. The electronic device may display an object having a size increased or decreased in proportion to the changed depth value.

FIG. 13 illustrates a series of operations of displaying an object having the changed depth value and the changed size based on the changed depth value.

Referring to FIG. 13, the electronic device may display an image 1300 (which is a result obtained by composing a color image and a depth map) including the background subject 412 and the foreground subject 414. The electronic device may display an object 1316 on the image 1300 in response to a user input of selecting an object. According to an embodiment, the electronic device may display an indicator 1318 representing that the object 1316 is being currently edited. The electronic device may display the object 1316 reduced in depth value and size, in response to a user input of changing the depth value of the object 1316. As illustrated in FIG. 13, when the depth value of the object 1316 is smaller than a lower limit of a depth value range of the foreground subject 414, the object 1316 may be displayed in the rear of the foreground subject 414.

According to an embodiment, as illustrated in FIG. 13, the electronic device may edit the object 1316 in response of at least one user input of editing the object 1316, in addition to the operation of changing the depth value and the size of the object 1316 in response to the user input of changing the depth value. For example, the electronic device may display the object 1316 having the changed position in response to of a user input of moving the central coordinates in the 2D coordinate system of the image area. For another example, the electronic device may display the object 1316 rotated in response to a user input of rotating corner coordinates in the 2D coordinate system of the image area corresponding to the object 1316. For another example, the electronic device may cancel the display of the indicator 1318 in response to a user input of inputting, in the image 1300, an area in addition to the object 1316.

The electronic device may provide, for a user, a visual effect that the perspective of an object is adjusted inside an image by adjusting the size of the object based on the changed depth value of the object.

Figure 14:
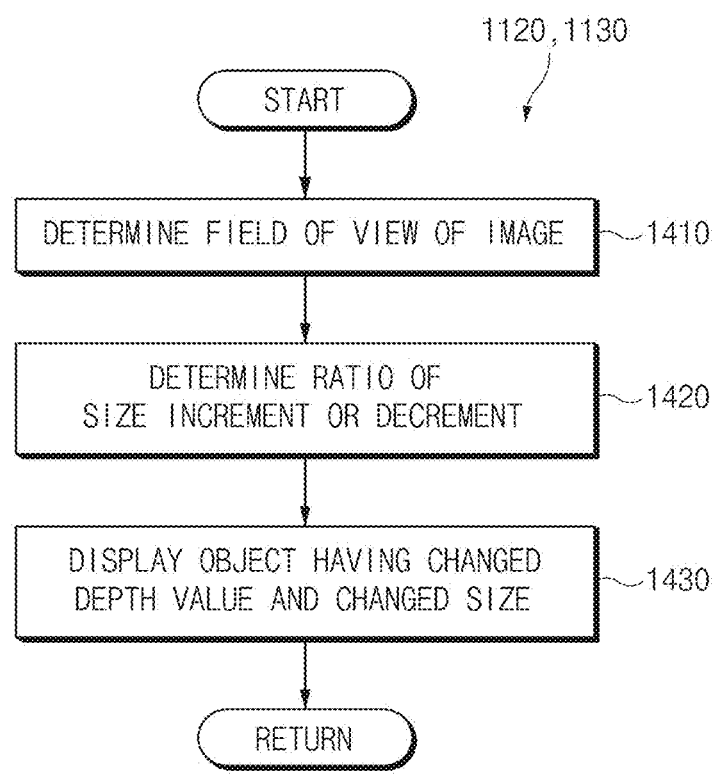
FIG. 14 illustrates a flowchart of an operation of an electronic device for displaying an object having a changed depth value and a changed size by using the changed depth value and the information on the field of view (FOV) of the image, according to various embodiments of the disclosure.
Figure 15:
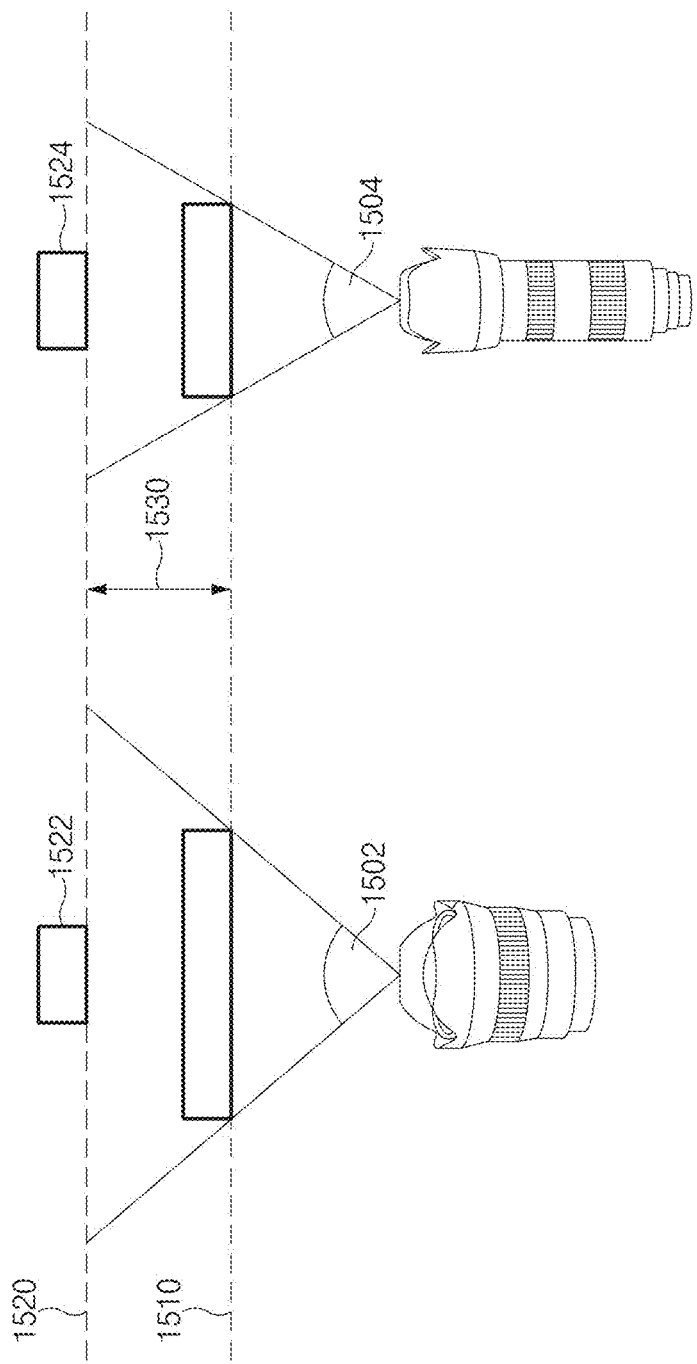
FIG. 15 is a view illustrating an operation of determining the size of the object, based on the changed depth value and the information on the FOV of the image, according to various embodiments of the disclosure.

FIGS. 14 to 15 illustrate a series of operations of displaying an object changed in depth value and size by using the changed depth value and the field of view (FOV) of an image. Operations illustrated in FIG. 14 may be obtained by implementing operation 1120 to operation 1130 of FIG. 11 in more detail.

Referring to FIG. 14, in operation 1410, the electronic device may determine the FOV of the image. In operation 1420, the electronic device may determine the size increment or the size decrement of the object, based on changed depth values and FOVs of images. For example, referring to FIG. 15, an FOV of an image in which an object 1522 is composed may be greater than an FOV of an image in which an object 1524 is composed. When the respective depth values of the object 1522 and the object 1524 are increased by a value indicated by reference numeral 1530, the respective sizes of the object 1522 and the 1524 may be increased in proportion to the increased depth value, and the size increment or size decrement may be varied depending on the difference between an FOV 1502 and an FOV 1504. For example, although the size of the object 1522 displayed on a plane 1520 is equal to the size of the object 1524, the size of the object 1522 displayed on the plane 1510 may be greater than the size of the object 1524 displayed on the plane 1510.

In operation 1430, the electronic device may display at least a portion of the object changed in depth value and size, based on the determined size increment or decrement. The electronic device may provide, for a user, a visual effect that the size of the object may be increased or decreased variously depending on the information on the FOV of the image.

Figure 16:
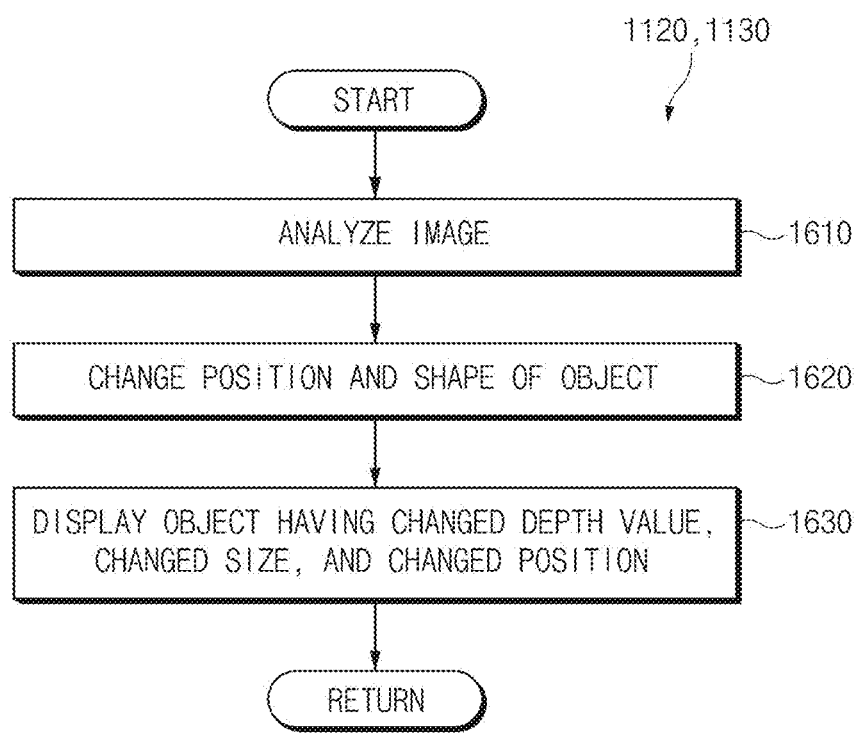
FIG. 16 illustrates a flowchart illustrating the operation of the electronic device for displaying an object changed in depth, size, and position, based on the changed depth value and a vanishing point of the image, according to various embodiments of the disclosure.

FIGS. 16 to 17 illustrate a series of operations of displaying an object changed in depth, size, shape, and position based a direction of reducing an image, which is obtained image analysis, and a changed depth according to various embodiments. Operations illustrated in FIG. 16 may be obtained by implementing operation 1120 to operation 1130 of FIG. 11 in more detail.

Referring to FIG. 16, in operation 1610, an electronic device may determine a direction (e.g., a vanishing point) of reducing a captured image by analyzing information on the captured image.

Referring to FIG. 17, regarding an image 1700 including a background subject 1712 and a foreground subject 1714, the electronic device may determine a vanishing point 1720 for reducing the image 1700 in a specific direction, by analyzing the direction of a front line, the direction of distorting the object, or an angle of a horizontal line in the image 1700. The electronic device may recognize the position of the vanishing point 1720 as a 2D-coordinate value or as a pixel value in the image 1700. According to various embodiments, the electronic device may obtain the direction of reducing an image based on depth information in addition to a scheme of analyzing the image. For example, referring to FIG. 4A, since the depth value distribution of the image area 422 is smaller than the depth value distribution of the image area 424 in the depth map 420, the electronic device may determine the direction from the image area 424 to the image area 422 as the direction of reducing the image 410.

In operation 1620, the electronic device may change the shape, the size, and the position of the object, based on the information (e.g., the information on the vanishing point) on the direction of reducing the image and the changed depth value of the object. In operation 1630, the electronic device may display at least a portion of the object changed in depth value, size, and position in the image. For example, referring to FIG. 17, an object 1716 may be composed at the left side of a foreground subject 1714 in the image 1700 in response to a user input of adding an object. According to an embodiment, the electronic device may recognize the position of the object 1716 as a 2D-coordinate value or a pixel value in the image. When the depth value of the object 1716 is reduced in response to the user input, the electronic device may deform (or distort) the shape of the object 1716 to correspond to a line extending toward the vanishing point 1720, may change the position of the object 1716 to reduce the distance between the object 1716 and the vanishing point 1720, and may change the size of the object 1716 based on the changed depth value.

The electronic device may change even the position of the object as well as the size of the object and the size increment or decrement, based on the changed depth value, thereby providing, for a user, a visual effect that the perspective of the object is adjusted by naturally deforming the object inside an image in a direction of a vanishing point, which is the direction of reduction the image).

As described above, an electronic device (e.g., the electronic device 101) may include a display (e.g., the display device 160), a memory (e.g., the memory 130), and a processor (e.g., a processor 120 or an image signal processor 260). The processor may be configured to display an image (e.g., an image obtained by composing a color image 410 and a depth map 420) by using the display, to display one or more objects (e.g., the first object 516) on a first area of the image, at least based on a first user input, to determine a depth value of the object, at least based on a second user input, to display at least a portion of the object on the image, based on the determined depth value of the object and depth information of the first area, and to store, in the memory, depth data (e.g., depth data 520) and color data (e.g., color data 510) of an image to which the object is added. According to an embodiment, the processor may be configured to store, in the memory, the image, to which the object is added, with data different from data of the image. According to an embodiment of the disclosure, the image may include a preview image acquired by using the image sensor.

According to an embodiment of the disclosure, the processor may be configured to determine a depth value range of the first area, at least based on the second user input, and to display the at least a portion of the object on the image, based on the determined depth value of the object and the determined depth value range of the first area. In addition, the processor may be configured to determine a depth value range of the image, and display an indicator (e.g., an indicator 1035) regarding the depth value of the object by using the display, based on the determined depth value range of the image.

According to an embodiment of the disclosure, the processor may be configured to recognize the determined depth value of the object, at least based on the second user input, to determine a size of the object, based on the determined depth value of the object, and to display the at least a portion of the object on the image, based on at least one of the determined depth value of the object, the determined size of the object, or the depth information of the first area. In addition, the processor may be configured to determine information on a FOV of the image, to determine an increment or decrement in the size of the object, based on the determined information on the FOV of the image and the determined depth value of the object, and to display the at least a portion of the object on the image, based on the determined increment or decrement in the size of the object. In addition, the processor may be configured to determine a vanishing point of the image, to determine a position of the object, based on the determined vanishing point of the image, and to display the at least a portion of the object on the image, based on at least one of the determined depth value of the object, the determined size of the object, or the determined position of the object.

As described above, a method of an electronic device (e.g., an electronic device 101) disclosed in the disclosure may include displaying an image (e.g., an image obtained by composing a color image 410 and a depth map 420), displaying one or more objects (e.g., the object 516) on a first area of the image, at least based on a first user input, determining a depth value of the object, at least based on a second user input, displaying at least a portion of the object on the image, based on the determined depth value of the object and depth information of the first area, and storing depth data (e.g., depth data 520) and color data (e.g., color data 510) of an image to which the object is added. The storing of the depth data and the color data may include storing the depth data as at least a portion of metadata of the color data.

According to an embodiment of the disclosure, the displaying of at least the portion of the object may include determining a depth value range of the first area, at least based on the second user input, and displaying the at least a portion of the object on the image, based on the determined depth value of the object and the determined depth value range of the first area.

According to an embodiment of the disclosure, the method may further include determining a depth value range of the image, and displaying an indicator regarding the depth value of the object, based on the determined depth value range of the image.

According to an embodiment of the disclosure, the displaying of the at least a portion of the object on the image may include recognizing the determined depth value of the object, at least based on the second user input, determining a size of the object, based on the determined depth value of the object, and displaying the at least a portion of the object on the image, based on at least one of the determined depth value of the object, the determined size of the object or the depth information of the first area.

According to an embodiment of the disclosure, the displaying of the at least a portion of the object on the image may include determining information on a FOV of the image, determining an increment or decrement in the size of the object, based on the determined information on the FOV of the image and the determined depth value of the object, and displaying the at least a portion of the object on the image, based on the determined increment or decrement of the size of the object.

According to an embodiment of the disclosure, the displaying of the at least a portion of the object on the image may include determining a vanishing point of the image determining a position of the object, based on the determined vanishing point of the image, and displaying the at least a portion of the object on the image, based on at least one of the determined depth value of the object, the determined size of the object, or the determined position of the object.

As described above, an electronic device (e.g., an electronic device 101) disclosed in the disclosure may include one or more image sensors (e.g., a camera module 180 or an image sensor 230) configured to acquire a color image (e.g., a color image 410) or a depth map (e.g., a depth map 420), a display (e.g., a display device 160), a memory (e.g., a memory 130), and a processor (e.g., a processor 120 or an image signal processor 260). The processor may be configured to create an image by composing the color image and the depth map, to display the image by using the display, to display an object (e.g., an object 516) on a first area of the image, at least based on a first user input, to determine a depth value of the object, at least based on a second user input, to display at least a portion of the object on the image, based on the determined depth value of the object and depth information of the first area, and to store, in the memory, depth data (e.g., depth data 520) and color data (e.g., color data 510) of an image to which the object is added.

According to an embodiment of the disclosure, the processor may be configured to determine a depth value range of the first area, at least based on the second user input, and to display the at least a portion of the object on the image, based on the determined depth value of the object and the determined depth value range of the first area.

According to an embodiment of the disclosure, the processor may be configured to determine a depth value range of the image, and to display an indicator regarding the depth value of the object by using the display, based on the determined depth value range of the image. In addition, the processor may be configured to recognize the determined depth value of the object, at least based on the second user input, to determine a size of the object, based on the determined depth value of the object, and to display the at least a portion of the object on the image, based on at least one of the determined depth value of the object, the determined size of the object or the depth information of the first area In addition, the processor may be configured to determine information on a FOV of the image, to determine an increment or decrement in the size of the object, based on the determined information on the FOV of the image and the determined depth value of the object, and to display the at least a portion of the object on the image, based on the determined increment or decrement of the size of the object.

According to various embodiments of the disclosure, the electronic device may include various types of devices. For example, the electronic device may include at least one of a portable communication device (e.g., smartphones), a computer device, a portable multimedia device, a portable medical device, a camera, or a wearable device. According to an embodiment of the disclosure, the electronic device is not limited to the above-described electronic devices.

It should be understood that various embodiments of the disclosure and terms used in the embodiments do not intend to limit technologies disclosed in the disclosure to the particular forms disclosed herein; rather, the present disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

In accordance with an aspect of the disclosure, it may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a memory;
    at least one image sensor; and
    a processor,
    wherein the processor is configured to:
        control the at least one image sensor to acquire a color image and a depth map, the depth map corresponding to a distribution of depth values of pixels constituting the color image,
        separate a first image area of the depth map from a second image area of the depth map based on the distribution of depth values, such that pixels of the color image corresponding to the first image area have depth values within a first range, and pixels of the color image corresponding to the second image area have depth values within a second range, the second range being distinct from the first range,
        control the display to display an image corresponding to the color image based on the depth map,
        control the display to display an object on a first area of the image, based on a first user input, wherein the displayed object is a new object which is not extracted from the image,
        receive a second user input to change a depth value of the object,
        identify information on a field of view (FOV) of the image, wherein the information on the FOV indicates an FOV attribute value of the at least one image sensor,
        determine a degree of size increment or decrement of the object corresponding to the changed depth value based on the information on the FOV, wherein the degree of size increment or decrement is proportion to the FOV attribute value,
        change a size of the object based on the determined degree of size increment or decrement,
        if the changed depth value of the object is between a maximum value of the first range and a minimum value of the second range, control the display to display an image by composing the color image and the object based on the first image area, the second image area, and the changed depth value of the object such that the object is placed on a virtual plane interposed between a first virtual plane of the first image area and a second virtual plane of the second image area, and
        store, in the memory, depth data and color data of the image to which the object is added.

2. The electronic device of claim 1,
    wherein the image data is obtained based on the color image and the object, and
    wherein the depth data corresponds to a distribution of depth values of pixels constituting the image data.

3. The electronic device of claim 1, wherein the processor is further configured to:
    determine a depth value range of the image, and control the display to display an indicator regarding the depth value of the object, based on the determined depth value range of the image.

4. The electronic device of claim 1, wherein the processor is further configured to:
determine a vanishing point of the image,
determine a position of the object, based on the determined vanishing point of the image, and
control the display to display the at least a portion of the object on the image, based on at least one of the changed depth value of the object, the changed size of the object, or the determined position of the object.

5. The electronic device of claim 1, further comprising:
at least one image sensor,
wherein the image includes a preview image acquired by using the at least one image sensor.

6. The electronic device of claim 1, wherein the processor is further configured to:
determine if the changed depth value of the object is between the value of the first range and the value of the second range,
compose the image to be obscured by at least a portion of the first image area,
compose the image to obscure at least a portion of the second image area, and
place the object on the virtual plane interposed between the first virtual plane of the first image area and the second virtual plane of the second image area.

7. A method of an electronic device, the method comprising:
acquiring a color image and a depth map, the depth map corresponding to a distribution of depth values of pixels constituting the color image;
separating a first image area of the depth map from a second image area of the depth map based on the distribution of depth values, such that pixels of the color image corresponding to the first image area have depth values within a first range, and pixels of the color image corresponding to the second image area have depth values within a second range, the second range being distinct from the first range;
displaying an image corresponding to the color image based on the depth map;
displaying an object on a first area of the image, based on a first user input, wherein the displayed object is a new object which is not extracted from the image;
receiving a second user input to change a depth value of the object;
identifying information on a field of view (FOV) of the image, wherein the information on the FOV indicates an FOV attribute value of at least one sensor;
determining a degree of size increment or decrement of the object corresponding to the changed depth value based on the information on the FOV, wherein the degree of size increment or decrement is proportion to the FOV attribute value;
changing a size of the object based on the determined degree of size increment or decrement;
if the changed depth value of the object is between a value of the first range and a value of the second range, displaying an image by composing the color image and the object based on the first image area, the second image area, and the changed depth value of the object such that the object is placed on a virtual plane interposed between a first virtual plane of the first image area and a second virtual plane of the second image area; and storing depth data and color data of the image to which the object is added.

8. The method of claim 7, wherein the image data is obtained based on the color image and the object, and the depth data corresponds to a distribution of depth values of pixels constituting the image data.

9. The method of claim 7, further comprising:
determining a depth value range of the image; and
displaying an indicator regarding the depth value of the object, based on the determined depth value range of the image.

10. The method of claim 7, wherein the displaying of the at least a portion of the object on the image includes:
determining a vanishing point of the image;
determining a position of the object, based on the determined vanishing point of the image; and
displaying the at least a portion of the object on the image, based on at least one of the changed depth value of the object, the changed size of the object, or the determined position of the object.

11. A portable communication device comprising:
a display;
an image sensor;
a memory; and
a processor configured to:
obtain an image via the image sensor, the obtaining including generating a depth map corresponding to the image including a plurality of depth values each corresponding to a respective portion of the image,
display the image based on the depth map via the display,
display an object having a depth value based on a first user input while the image is displayed, wherein the displayed object is a new object which is not extracted from the image,
receive a second user input to adjust a depth value of the object,
identify information on a field of view (FOV) of the image, wherein the information on the FOV indicates an FOV attribute value of the image sensor,
determine a degree of size increment or decrement of the object corresponding to the adjusted depth value based on the information on the FOV,
wherein the degree of size increment or decrement is proportion to the FOV attribute value,
change a size of the object based on the determined degree of size increment or decrement,
display a composed image by composing the image and the object such that a portion of the object as obscured by a portion of the image or as obscuring the portion of the image based on comparing of the depth value of the object and a depth value corresponding to the portion of the image, and
store, in the memory, depth data and color data of the composed image,
wherein the image includes a first portion corresponding to a first depth value of the plurality of depth values and a second portion corresponding to a second depth value of the plurality of depth values different than the first depth value,
wherein the processor is further configured to display the portion of the object based on when the depth value of the object falls between the first depth value and second depth value, and
wherein the object is placed on a virtual plane interposed between a first virtual plane of the first portion and a second virtual plane of the second portion.

12. The portable communication device of claim 11, wherein the processor is further configured to generate another image using the image and the object.

13. The portable communication device of claim 12, wherein the processor is further configured to generate another depth map corresponding to the other image using the depth map corresponding to the image and the depth value corresponding to the object.

14. The portable communication device of claim 11, wherein the processor is further configured to:
- as at least part of the displaying of the image, display a captured image corresponding to the image, and
- receive the first user input as part of a request to edit the captured image.

15. The portable communication device of claim 11, wherein the processor is further configured to:
- as at least part of the displaying of the image, display a live view image corresponding to the image, and
- generate, in response to a third user input, a captured image corresponding to the image as the object is inserted in the live view image based on a corresponding one of the depth value of the object and the depth value corresponding to the portion of the image.

16. The portable communication device of claim 11, wherein the processor is further configured to, as at least part of the displaying of the portion of the object, based on when the depth value of the object falls between the first depth value and second depth value, display the object as obscuring a first overlapping portion of the object and the first portion of the image and being obscured by a second overlapping portion of the object and the second portion of the image.

17. The portable communication device of claim 11, wherein the processor is further configured to display the portion of the object on another virtual plane.

* * * * *